UNITED STATES PATENT OFFICE.

HARRY O. CHUTE, OF CLEVELAND, OHIO.

PROCESS OF TREATING RUBBER AND PRODUCT OF THE SAME.

1,051,987.  Specification of Letters Patent.  Patented Feb. 4, 1913.

No Drawing.  Application filed October 9, 1908. Serial No. 456,932.

*To all whom it may concern:*

Be it known that I, HARRY O. CHUTE, a citizen of the United States, residing at Cleveland, in the county of Cuyahoga and State of Ohio, have invented certain new and useful Improvements in Processes of Treating Rubber and Product of the Same; and I do hereby declare the following to be a full, clear, and exact description of the same, such as will enable others skilled in the art to which it appertains to practice and use the same.

This invention relates to processes of treating rubber and products of the same; and it comprises a method of improving the quality of raw rubber in which said rubber is macerated in a chemically unchanged state with a permeating liquid holding certain dissolved products of the destructive distillation of wood and it also comprises products of said process; all as more fully hereinafter set forth and as claimed.

In the production of high grade rubbers, such as Para rubber and others, the coagulum from the latex is treated by smoking with fire gases. While this is usually supposed to effect mainly the nature of the aqueous liquid or serum in forming the coagulated latex, as a matter of fact, it affects the separated caoutchouc gum itself, and it is to this fact that the recognized high quality of the Para gum and its desirable mechanical properties are in part due. Modern low-grade resinous rubbers, like guayule and gum Pontianak are not so treated by smoking, and, as a matter of fact, if they were it would be of little effect, the real rubber present being so small in amount and so thoroughly protected by resins and other impurities present; the amount of such impurities being very frequently much greater than that of the rubber gum itself.

I have discovered that by macerating crude untreated rubber with certain products originating in the destructive distillation of wood and other vegetable matters, these products being dissolved in a penetrating or permeating liquid which will reach all parts of said rubber, like effects can be secured in a greater degree. In the case of the low grade rubbers, it is desirable that the extraneous matter be, at least in greater part, removed, prior to or during this treatment.

In the destructive distillation of woody fiber, and like materials, a great variety of substances are formed, their nature being for the most part unknown. The condensate from such distillation however always separates into an aqueous portion, the so-called pyroligneous acid, and an underlying layer of wood tar. Pyroligneous acid, freed so far as practicable from suspended tarry particles, is an acid brownish watery liquid containing as its main, and valuable constituents, a few per cent. of acetic acid and of the volatile neutral bodies (principally methyl alcohol, methyl esters and what is known as "methyl acetone") which together form the crude wood alcohol of commerce. It is a dilute watery solution of these bodies but it also contains small amounts of many other tarry and oily substances of wholly unknown constitution in important amount held in solution by the acid and the alcohol. Upon separating the pyroligneous acid from tar so far as possible, and distilling it as a whole; that is, distilling over the wood spirit and acetic acid from the separated pyroligneous acid, there remains in the still a residuum of tarry and oily bodies which had been held in solution in the original pyroligneous acid but did not distil. Many of these substances appear to be soluble in water and of acid nature, though their chemical nature is otherwise unknown. It is these oily and tarry acid bodies which appear to be the active agents in my new process, though this is merely a deduction on my part. Similar bodies appear to be contained in the wood tar from which the pyroligneous acid has been separated as far as possible. On macerating raw rubber with bodies of this nature dissolved in a liquid capable of penetrating the mass of rubber without dissolving it and of contacting with its particles, an effect on the rubber similar to that produced by the stated smoking of Para rubber is the result; but this effect is apparently both greater in degree and different in kind; which is possibly due both to the fact that the active bodies are contained in but a minimal amount in wood smoke, such smoke being largely products of combustion and air with only a small amount of suspended matter, and to the inefficient contact of the smoke with the moist rubber. The stated pyroligneous acid is such a suitable penetrating and treating liquid for the present purposes, it being able to carry its dissolved constituents throughout a mass of crude rubber and advantageously affect the granules therewith. Another suitable liquid may be prepared with the aid of any of the ordinary resin solvents for removing the resin from crude rubber; such solvent being of course preferably one in which the rubber itself is as little soluble as possible, such a methyl acetate or ethyl acetate, alcohol, methyl alcohol, acetone, "methyl acetone," etc. In such a solvent may be dissolved a proportion of wood tar, or a proportion of the bodies remaining behind in the distillation of pyroligneous acid, thereby producing a solution adapted for the present purposes. With resinous low-grade rubbers, the solution is preferably used after the resin-extraction step to preclude shielding of the rubber particles by such resin.

When a crude rubber is tolerably high-grade, it may be treated directly by maceration with any suitable machinery such as the washing rolls of rubber works, in the presence of crude pyroligneous acid, which may be that which has been settled tar-free but still contains the dissolved bodies stated. Distillates from pyroligneous acid, which have been freed of the relatively non-volatile bodies of the crude acid, are of little use for the present purposes. Or the rubber may be macerated in the presence of a solution of wood tar in any suitable penetrating volatile solvent; a body which, as stated, is not a solvent for the rubber itself. Alcohol, acetone, methyl or ethyl acetate, "methyl acetone," or mixtures of these substances, may be used as the tar solvent. Even smoked Para and other high-grade rubbers may be so treated with advantage, as the curing in the smoking has rarely gone so far as to produce the maximum best results. But my invention I regard as more particularly applicable to the low-grade, unsmoked commercial raw rubbers like guayule and Pontianak.

In treating low-grade rubbers of this class, they are generally best treated previously in some way which will extract resin and like impurities without materially affecting the rubber. For the present purposes it is necessary that the crude rubber itself be left of its natural character. In this extraction, the method and means of my Patents Nos. 890,216 and 890,217, June 9, 1908, and No. 845,616, Feb. 26, 1907, may be advantageously employed. After the crude rubbers have been macerated in the presence of a neutral volatile solvent to dissolve out the resin, the amount of rubber material to be treated is less and such rubber is, moreover, efficiently exposed to the action of the treating solution while such of its natural constituents which have not been extracted by the solvent are not chemically changed thereby. Where deresination is effected in a plurality of stages, in the final stage the deresinating solution employed may have wood tar or the residues from distilled pyroligneous acid dissolved therein. Or the completely deresinated rubber may be macerated in the presence of a portion of a tar-containing volatile solvent in which the rubber is not soluble, or in the presence of pyroligneous acid, the latter serving both for the described treating action and also for mechanical purification to remove sticks, leaves, sand, etc. Ordinary crude pyroligeous acid from wood distillation, simply decanted from the co-produced tar, is well suited for the present purposes. A desirable method of effecting the desired results is to deresinate a low-grade rubber with a resin solvent, preferably one of the protected esters described in my stated prior patents, and then macerate the deresinated rubber in the presence of pyroligneous acid till all mechanical impurities are removed and the desired effect is produced upon the rubber as described. A phenomenon frequently observed with these low-grade rubbers is that on standing they are apt to soften, the rubber in places losing its peculiar consistency and properties; an action possibly due to bacterial growth or natural enzymes. The described treatment with wood products arrests this action, and rubber so treated is permanent retaining its "nerve."

In using a solution of wood tar in such non-solvents for rubber as acetone, alcohol, etc., where it is desired to increase the effect after maceration to produce a thorough impregnation of the rubber with such solution, the liquid may be somewhat diluted with water to produce more or less precipitation, thereby embodying the oily or tarry matters in the rubber in a state of thorough dissemination.

What I claim is:

1. The process of impregnating, preserving and treating crude rubber material containing rubber in its natural or chemically unchanged crude state and free of reactive chemicals which comprises macerating such a crude material in the presence of a penetrating liquid carrying dissolved therein oily products of the destructive distillation of wood, said liquid being one in which rubber itself is substantially insoluble.

2. The process of impregnating, preserving and treating crude rubber material containing rubber in its natural or chemically unchanged crude state and free of reactive chemicals which comprises macerating such a crude material in the presence of a crude pyroligneous acid carrying dissolved therein oily products of the destructive distillation of wood.

3. The process of treating low-grade rubber which comprises extracting the resin from the same with a neutral volatile resin solvent and macerating the deresinated rubber with a liquid carrying dissolved therein oily products of the destructive distillation of wood, such liquid being one in which rubber itself is substantially insoluble.

4. The process of treating low-grade rubber which comprises extracting the resin from the same with a neutral volatile resin solvent and macerating the deresinated rubber with pyroligneous acid carrying dissolved therein oily products of the destructive distillation of wood.

5. The process of impregnating, preserving and treating Pontianak rubber which comprises deresinating such Pontianak rubber with a neutral volatile resin solvent and macerating with a penetrating liquid carrying dissolved therein oily products of the destructive distillation of wood, such liquid being one in which such rubber itself is substantially insoluble.

6. The process of impregnating, preserving and treating crude rubber which comprises macerating a rubber material containing rubber in its chemically unchanged natural or crude state and free of reactive chemicals with crude pyroligneous acid liquor.

7. As a new article of manufacture, a deresinated low grade rubber material containing rubber in a chemically unchanged natural or crude state impregnated with oily products of the destructive distillation of wood.

8. As a new article of manufacture, a rubber material comprising deresinated Pontianak rubber in a chemically unchanged natural or crude state and impregnated with pyroligneous acid containing oily products of the destructive distillation of wood.

9. As a new article of manufacture, a deresinated chemically unchanged raw or crude rubber impregnated with oily pyroligneous products.

In testimony whereof I affix my signature in the presence of two witnesses.

HARRY O. CHUTE.

Witnesses:
K. P. McElroy,
Alfred M. Houghton.